United States Patent [19]

Daitoku

[11] 4,239,166
[45] Dec. 16, 1980

[54] POWER-DRIVEN REWIND DEVICE OF A CAMERA

[75] Inventor: Koichi Daitoku, Tokyo, Japan

[73] Assignee: Nippon Kogaku K.K., Tokyo, Japan

[21] Appl. No.: 75,332

[22] Filed: Sep. 13, 1979

[30] Foreign Application Priority Data

Sep. 14, 1978 [JP] Japan .......................... 53/125459[U]

[51] Int. Cl.³ .............................................. G03B 1/04
[52] U.S. Cl. .................................................. 242/71.6
[58] Field of Search ................... 242/71.6, 71.2, 71.4, 242/71.5; 354/206, 212, 213, 214, 215, 216

[56] References Cited

U.S. PATENT DOCUMENTS

| | | | |
|---|---|---|---|
| 3,004,482 | 10/1961 | Muller | 242/71.4 X |
| 3,423,041 | 1/1969 | Steisslinger | 242/71.6 |
| 4,089,483 | 5/1978 | Hokkanji | 242/71.4 |

Primary Examiner—Edward J. McCarthy
Attorney, Agent, or Firm—Fitzpatrick, Cella, Harper & Scinto

[57] ABSTRACT

A power-driven rewind device for rewinding a film taken up on a take-up spool shaft onto a supply spool shaft comprises a first gear coupled to and rotatable with the supply spool shaft, a second gear operatively associated with the rotation of a motor when the film is rewound, a third gear meshing with both of the first and second gears and thereby displaceable between a coupled position and a disengaged position, and changeover means operatively associated with the rotation of the second gear to displace the third gear to the coupled position.

5 Claims, 9 Drawing Figures

POWER-DRIVEN REWIND DEVICE OF A CAMERA

BACKGROUND OF THE INVENTION

1. Field of the Invention

This invention relates to a power-driven rewind device for rewinding the film of a camera.

2. Description of the Prior Art

In the power-driven film advance and rewind device of a camera, the film advance is achieved by driving, by rotation of a motor, a take-up spool for taking up the film supplied from a film cartridge loaded into the camera, and the rewind of the film into the cartridge after the completion of a predetermined amount of photography is achieved by driving a spool shaft in the cartridge by rotation of the motor. A clutch mechanism is required to selectively drive these two spools during the film advance and the film rewind, and particularly in the past, the engagement and disengagement between the spool shaft in the film cartridge and the film rewind system operated by the motor has been accomplished manually by a clutch mechanism operable extraneously of the camera and this has led to a disadvantage that the operation during the film rewind is cumbersome.

SUMMARY OF THE INVENTION

It is the object of the present invention to eliminate the above-noted disadvantage and to provide a power-driven rewind device of a camera in which the spool shaft in the film cartridge and the rewind system may be automatically coupled together and which is accordingly simple to operate.

The invention will become fully apparent from the following detailed description of some embodiments thereof taken in conjunction with the accompanying drawings.

DESCRIPTION OF THE PREFERRED EMBODIMENTS

Figure 1:
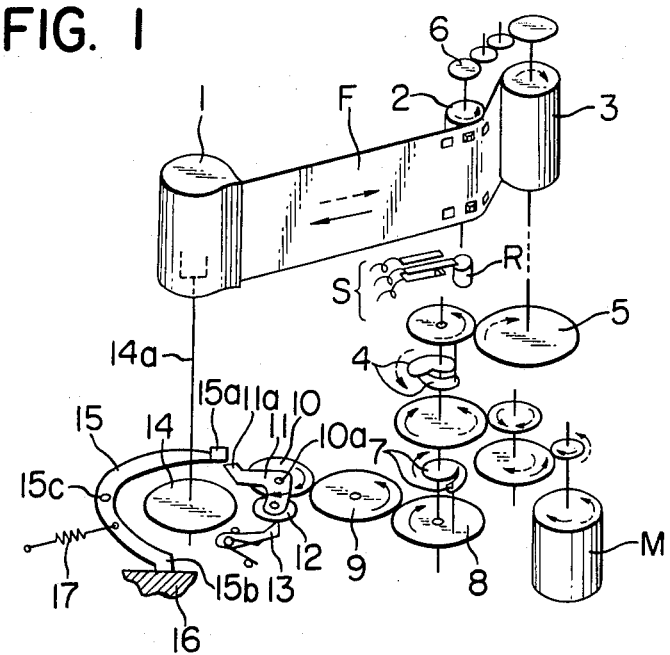
FIG. 1 schematically shows a first embodiment of the present invention.

Referring to FIG. 1 which schematically shows a first embodiment of the present invention, there is seen a film cartridge 1 contained in the film cartridge chamber of a camera, a film F, a sprocket 2, and a take-up spool 3. There is a motor M below the take-up spool 3. The motor M is provided so that the normal rotation thereof is transmitted through a clutch 4 to a gear 5, the take-up spool 3 and a gear 6 and that the reverse rotation thereof is transmitted through a clutch 7 to gears 8 and 9. A gear 10 is integrally formed with a rotary shaft 10a, and a lever 11 is friction-coupled to the rotary shaft 10a. A gear 12 is a so-called planet gear which is supported on the lever 11 and meshes with the gear 10. A retaining pawl 13 biased counter-clockwisely as viewed in FIG. 1 is in engagement with the gear 12. A shaft 14a having a gear 14 at one end thereof is coupled to the spool shaft in the cartridge 1. A lever 15 biased clockwisely as viewed in FIG. 1 by a spring 17 and having a rotary shaft 15c has a riser portion 15a at one end thereof, the riser portion 15a being opposed to the engaging portion 11a of the lever 11, and the other end 15b of the lever 15 is in contact with the back lid 16 of the camera. A rewind button R is of a conventional construction and serves to release the operative association between the sprocket 2 and remainder of the film advance system 3–6. A switch S is operatively associated with the rewind button R and controls the normal and reverse rotations of the motor M.

Figure 2:
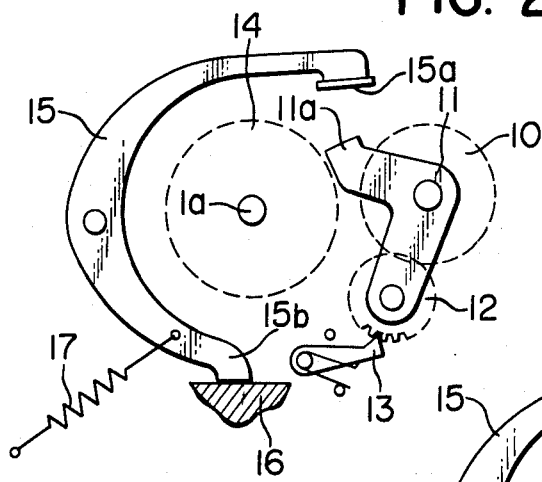
FIGS. 2, 3 and 4 are enlarged plan views of essential portions showing the operative condition of the first embodiment.
Figure 3:
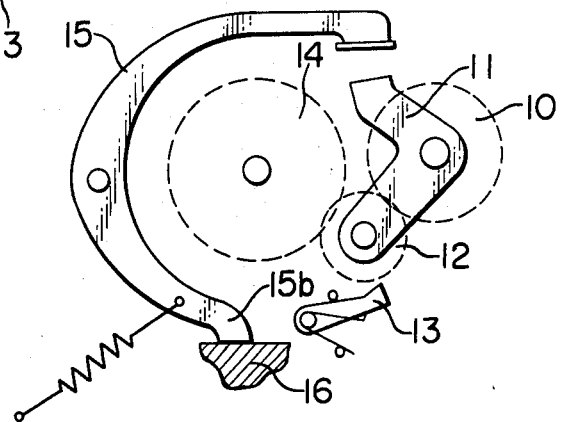
Figure 4:
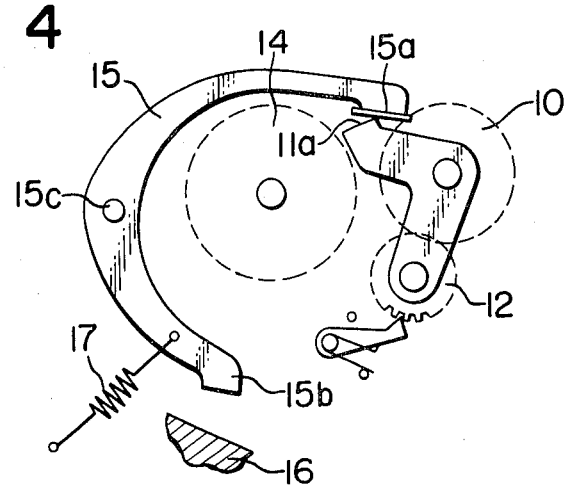

Reference is now had to FIGS. 2 to 4 to describe the operation of the present embodiment. When a shutter button, not shown, is depressed, the motor M effects normal rotation in counter-clockwise direction as viewed in the drawing to cause rotation of the sprocket 2 and the take-up spool 3 through the agency of the gears 5 and 6. At this time, the gear 8 is not rotated by the clutch 7. Accordingly, the film F is transported rightwardly as viewed in the drawing and taken up by the take-up spool 3.

When the rewind button R is forced up after completion of the photography of a prdetermined number of frames, the operative association between the sprocket 2 and the remainder of the film advance system 3–6 is released and the switch S is changed over. Then, even if the shutter button is not depressed, the motor M begins to effect reverse rotation in clockwise direction as viewed in the drawing. Such rotation of the motor M is not transmitted to the gears 5 and 6 by the clutch 4, but is transmitted to the gear 8 by the clutch 7. As the gear 10 is clockwisely rotated through the agency of the gear 9, the lever 11 friction-coupled to the rotary shaft 10a is rotated in the same direction and the gear 12 becomes disengaged from the retaining pawl 13. Then, the gear 12, engaging the gear 10, also comes into mesh engagement with the gear 14, as shown in FIG. 3. Accordingly, the reverse rotation of the motor M is transmitted to the gear 14, so that the spool shaft in the film cartridge 1 is reversely rotated and the film F is rewound into the cartridge 1.

When the back lid 16 is opened with the film F rewound into the cartridge 1, the lever 15 is clockwisely rotated by the biasing force of the spring 17 and the riser portion 15a bears against the end 11a of the lever 11, thus returning the lever 11 to the start position, as shown in FIG. 4.

Thereafter, if an unexposed film F is loaded into the camera and the back lid 16 is closed, the condition of FIGS. 1 and 2 will be restored.

Thus, according to the present embodiment, the coupling between the spool shaft in the cartridge and the rewind system can be accomplished automatically.

Figure 5:
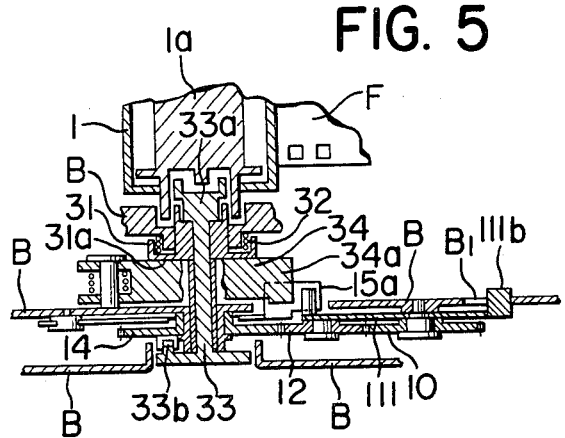
FIGS. 5 and 9 are cross-sectional views showing the essential portions of a second embodiment.
Figure 6:
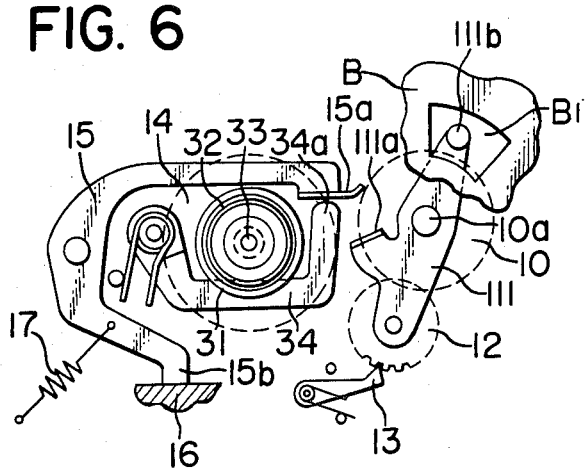
FIGS. 6, 7 and 8 are enlarged plan views of essential portions showing the operative condition of the second embodiment.
Figure 7:
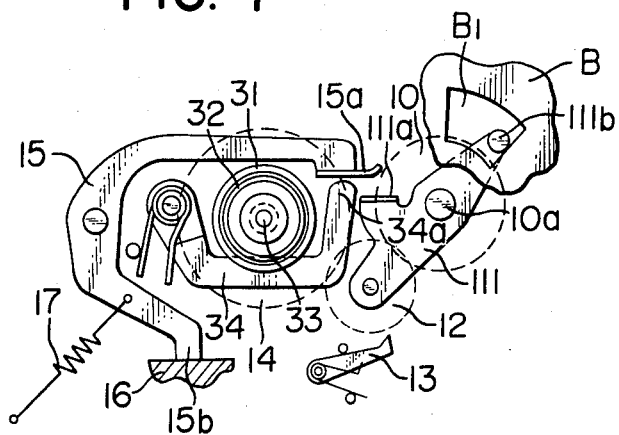

Description will now be made of an embodiment in which, when the back lid is opened, the connection between the spool shaft in the cartridge and the gear driving the same is broken to facilitate the removal of the cartridge from the cartridge chamber. FIGS. 5 to 9 show a second embodiment of the present invention. In the second embodiment, elements similar to those of the first embodiment are given similar reference characters and need not be described. In FIG. 5, the members corresponding to the members 2–9, R, S and M of FIG. 1 are not shown, but it is to be understood that these members are also provided in the second embodiment as in FIG. 1. In FIG. 5 which shows in cross-section the essential portions of the second embodiment, B designates the diecast of the camera body. An axially slidably provided bearing 31 is downwardly biased by a spring 32. A coupling member 33 slidable in the diecast with the bearing 31 and rotatable relative to the bearing 31 is provided at the upper end thereof with an engaging portion 33a for engaging the spool shaft 1a in the cartridge 1 and at the lower end thereof with an engaging portion for engaging the gear 14. Thus, the connection between the spool shaft 1a and the gear 14 is accomplished. A lever 34 biased counter-clockwisely as viewed in FIG. 6 is normally positioned below a bearing stepped portion 31a. The end 34a of the lever 34 is opposed to the riser portion 15a of the lever 15. A pin 111b provided on a lever 111 similar to the lever 11 of FIG. 1 fits in an opening B1 formed in the diecast B, and the wall surface of the opening B1 serves as the stopper for the lever 111, as shown in FIG. 7.

The operation of the second embodiment will now be described. When the rewind button R is forced upwardly after all of the film F has been taken up by the take-up spool 3 with the lever 111 and the gear 12 being in the position of FIG. 6, the motor M starts reverse rotation even if the shutter button is not depressed, and the gear 10 is rotated clockwisely through the agency of the gear 9, as viewed in FIG. 6. The level 111 friction-coupled to the rotary shaft 10a is also rotated in the same direction, so that the gear 12 becomes disengaged from the retaining pawl 13. When the movement of the lever 111 is limited by the engagement between the pin 111b and the wall surface of the opening B1, there is brought about the condition of FIGS. 7 and 5 in which the gear 12 meshes with the gears 14 and 10. Accordingly, the reverse rotation of the motor M is transmitted to the spool shaft 1a through the gear 14 and the coupling member 33, so that the film F is rewound into the cartridge 1.

Figure 8:
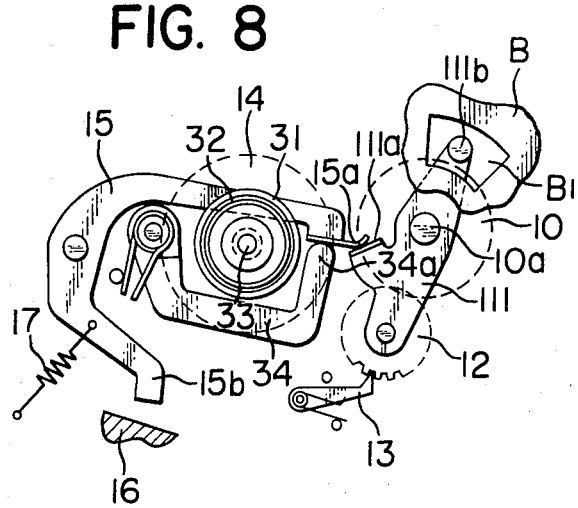
Figure 9:
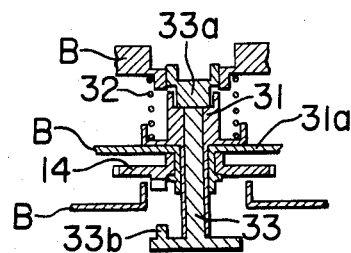

When the back lid 16 is opened with the film F rewound into the cartridge 1, the lever 15 is rotated clockwisely by a biasing force as viewed in FIG. 7, thus bringing about the condition as shown in FIGS. 8 and 9. That is, the riser portion 15a bears against the junction 111a of the lever 111 and the end 34a of the lever 34 to rotate these levers counterclockwisely and clockwisely, respectively. Accordingly, the lever 111 comes to be held at its original position (the position of FIG. 6) by the engagement between the gear 12 and the retaining pawl 13, and the lever 34 is retracted from the underside of the bearing stepped portion 31a. Due to the retraction of the lever 34, the spring 32 depresses the bearing 31 and the coupling member 33 to thereby retract the engaging portion 33a from the spool shaft 1a. When the engaging portion 33a is retracted from within the cartridge chamber as shown in FIG. 9, it becomes easy to remove the cartridge 1 from within the cartridge chamber.

After the cartridge 1 containing therein the exposed film has been removed, a cartridge 1 containing therein unexposed film is loaded into the cartridge chamber, the back lid 16 is closed and the coupling member 33 projected from the bottom surface of the diecast B is forced upwardly, whereupon the other members than the lever 111 and the gear 12 return to their positions shown in FIG. 6 with the lever 111 and the gear 12 still maintained in their positions of FIG. 6. This is the condition before the film advance is started.

In the first or the second embodiment, the lever 15 is operatively associated with the opening-closing of the back lid 16 itself. However, the lever 15 may be operatively associated with the member for opening and closing the back lid 16. That is, the lever 15 may be operatively associated with a member operative during the time from the completion of the film rewind till the start of the film advance to return the lever 11 or 111 or the lever 34 to its original position.

I claim:
1. In a device for driving, by a motor, a first spool shaft for supplying the film of a camera and a second spool shaft for taking up the supplied film, the improvement in a power-driven rewind device for rewinding the film taken up on said second spool shaft onto said first spool shaft comprising:
   (a) first gear means (14) coupled to and rotatable with said first spool shaft;
   (b) second gear means (10) operatively associated with the rotation of said motor when said film is rewound;
   (c) third gear means (12) meshing with both of said first and said second gear means and displaceable between a coupled position for enabling the transmission of the rotation of said motor to said first spool shaft and a disengaged position in which said third gear means is retracted from said coupled position to cut off said transmission; and
   (d) change-over means (11) operatively associated with the rotation of said second gear means to displace said third gear means to said coupled position.

2. A device according to claim 1, further comprising release means (15) operable to displace said third gear means to said disengaged position.

3. A device according to claim 1, wherein said change-over means includes:
   change-over lever means holding said third gear means and friction-coupled to said second gear means.

4. A device according to claim 2, wherein said release means is operable in response to the opening movement of the back lid of said camera.

5. In a device for driving, by a motor, a first spool shaft for supplying a film in a film cartridge loaded into a camera and a second spool shaft for taking up the supplied film, the improvement in a power-driven rewind device for rewinding the film taken up on said second spool shaft onto said first spool shaft comprising:
   (a) a coupling member (33) displaceable between a first position in which said coupling member can be coupled to said first spool shaft and a second position in which said coupling member is disengaged from said first spool shaft;
   (b) first gear means (14) rotatable with said coupling member;
   (c) second gear means (10) operatively associated with the rotation of said motor when said film is rewound;
   (d) third gear means (12) meshing with both of said first gear means and said second gear means and displaceable between a coupled position for enabling the transmission of the rotation of said motor to said first spool shaft and a disengaged position in which said third gear means is retracted from said coupled position to cut off said transmission;
   (e) change-over means (111) operatively associated with the rotation of said second gear means to displace said third gear means to said coupled position;

(f) means (34) for holding said coupling member in said first position; and (g) release means (115, 32) operable to displace said third gear means to said disengaged position and to engage said holding means to thereby release said hold and displace said coupling member to said second position.

* * * * *